N. VARS.
Side-Hill Plow.
No. 45,882. Patented Jan. 10, 1865.
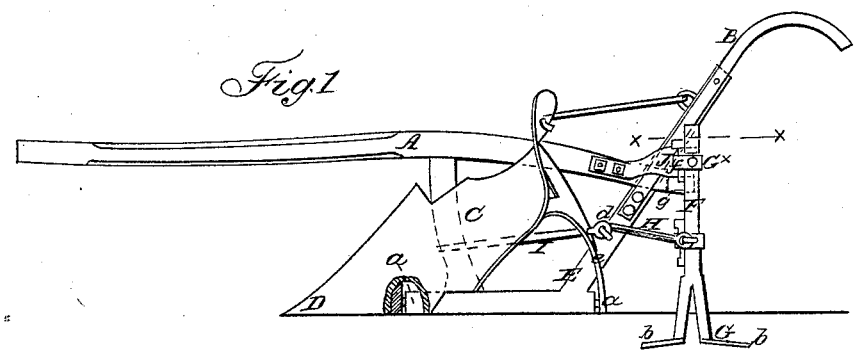
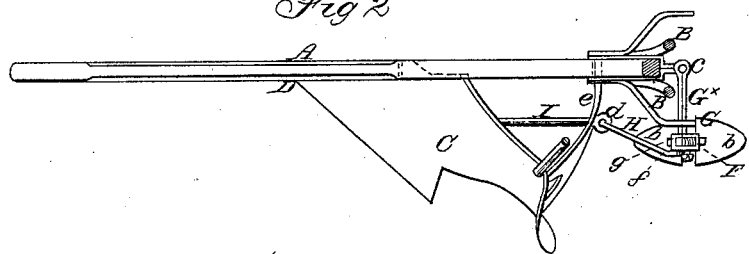
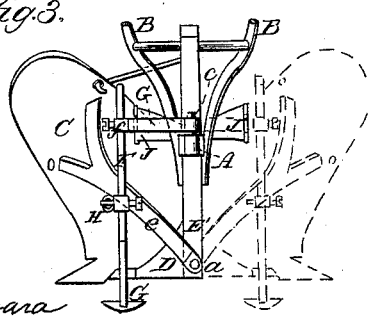
Witnesses:
Wm P McNamara
M M Livingston
Inventor:
Nathan Vars
per Munn & C.
Attys

UNITED STATES PATENT OFFICE.

NATHAN VARS, OF NEW MARKET, NEW JERSEY.

IMPROVEMENT IN SIDE-HILL PLOWS.

Specification forming part of Letters Patent No. 45,882, dated January 10, 1865.

*To all whom it may concern:*

Be it known that I, NATHAN VARS, of New Market, in the county of Middlesex and State of New Jersey, have invented a new and Improved Plow: and I do hereby declare that the following is a full, clear, and exact description thereof, which will enable others skilled in the art to make and use the same, reference being had to the accompanying drawings, forming a part of this specification, in which—

Figure 1 is a side view of my invention; Fig. 2, a horizontal section of the same, taken in the line $x\ x$, Fig. 1; Fig. 3, a back view of the same.

Similar letters of reference indicate like parts.

This invention relates to a combination of a subsoil and side-hill plow; and it consists in having the subsoil-share attached to an adjustable standard at the rear of the plow-beam, and arranged in such a manner that the subsoil-share may be adjusted either to the right or left side of the plow-beam, according to which side the mold-board and share of the sod-plow are adjusted, thereby admitting of a combination of the two plows, and in such a manner as to insure a perfect working of both.

A represents a plow-beam, and B B the handles thereof. These parts may be constructed in the usual way, and therefore do not require a minute description.

C represents the mold-board, and D the share of a side-hill plow. This mold-board and share are attached to the standard-frame E of the plow-beam A by a swivel-connection, (shown at $a\ a$; see more particularly Fig. 1,) to admit of said mold-board and share being adjusted to either side of the plow-beam A, as may be required. This arrangement need not vary essentially from that of any of the ordinary side-hill plows in use, and therefore a more minute description of them would be unnecessary.

F represents a standard, to the lower end of which the subsoil-share G is attached. This share is what may be termed of "double form," or of the same shape at both ends, as shown at $b\ b$. The upper end of the standard F is connected to an arm, $G^\times$, which is attached by a hinge or joint, $c$, to the back end of the beam A, the arm $G^\times$ being of such a length as to admit of the standard F being brought in line with the share D of the side-hill plow when the latter is at either side of the beam A. The standard is held in position by means of a hook, H, which is fitted in an eye, $d$, at the rear end of a rod, I, connected with the mold-board C, and an arm, $e$, at the rear of the latter. An arm or bracket, J, is attached, one to each side of the beam A, to receive the arm $G^\times$ and form a bearing for it at either side of the beam.

It will be seen from the above description that it is necessary to have the subsoil-share G of the same shape at both ends, as one end, $b$, is used when the share is at one side of the plow-beam, and the other end used when the share is at the opposite side of the beam.

I design to have the standard F connected to the arm $G^\times$ in such a manner that it may be adjusted higher or lower, according to the depth it is required for the subsoil-share G to penetrate the earth. In the drawings this is effected by having the standard pass through an eye, $f$, at the outer end of the arm, and a key, $g$, fitted in said eye to bind and firmly secure the standard in the eye. Other plans, however, may be employed to effect the same end.

Having thus described my invention, I claim as new and desire to secure by Letters Patent—

The employment or use, in a side-hill plow, of a subsoil-share, G, having its standard F attached to an adjustable or swinging arm, $G^\times$, arranged, substantially as shown, to admit of the subsoil-share being adjusted to either side of the plow-beam to suit the position of the mold-board C and share D, as set forth.

NATHAN VARS.

Witnesses:
J. B. GREEN,
C. C. MORAN.